M. A. RICHARDSON.
Wringer.

No. 165,754. Patented July 20, 1875.

Witnesses:
George Palliser
A. B. Fairchild.

Inventor:
Milo A. Richardson

UNITED STATES PATENT OFFICE.

MILO A. RICHARDSON, OF BRIDGEPORT, CONNECTICUT.

IMPROVEMENT IN WRINGERS.

Specification forming part of Letters Patent No. 165,754, dated July 20, 1875; application filed May 28, 1875.

*To all whom it may concern:*

Be it known that I, MILO A. RICHARDSON, of Bridgeport, in the county of Fairfield and in the State of Connecticut, have invented certain new and useful Improvements in Clothes-Wringers; and do hereby declare that the following is a full, clear, and exact description thereof, reference being had to the accompanying drawings and to the letters of reference marked thereon, making a part of this specification.

My invention relates to clothes-wringers, to be used on a wash-tub or other suitable attachment; and it consists of a single soft-rubber roller, which is turned by friction only on a smooth round shaft, with which it revolves between two wooden rollers, all in a continuous frame, the tension of the rollers being regulated by thumb-screws and wedges, thus dispensing with springs, boxes, and cogs.

I am aware that other wringer-rollers are turned by friction, but they are useless unless held firmly in place by corrugations or equivalents, and the friction of the shaft on the interior surface of the roller is so great as soon to wear loose, thus making the roller irregular in shape and useless. Others use more than one rubber roller, or, if not more than one, it is turned by cogs, and not friction; but the shaft which holds my rubber roller in place is purposely made smooth and round, and the roller will turn without wearing irregular in shape if it should work loose.

In order to enable others skilled in the art to which my invention relates to make and use the same, I will now proceed to describe its construction and operation, referring to the annexed drawing, in which—

Figure 1:
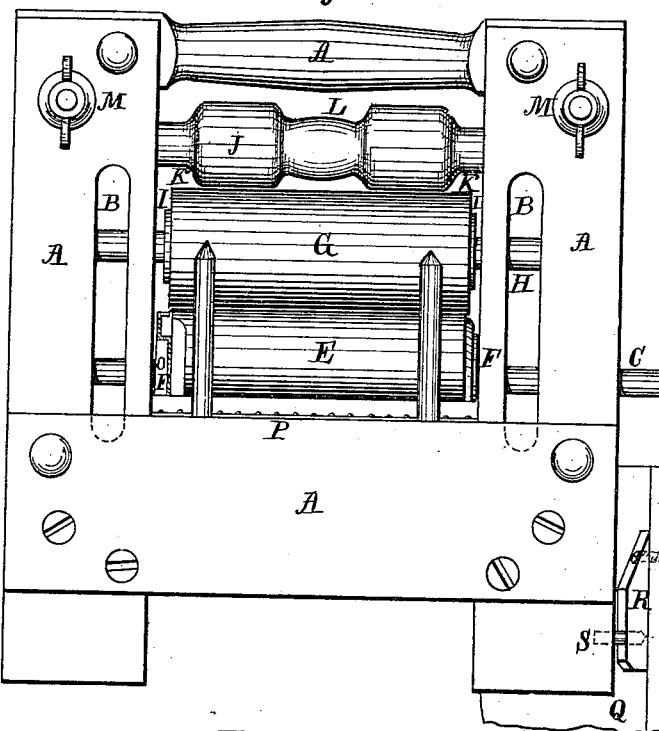
Figure 2:
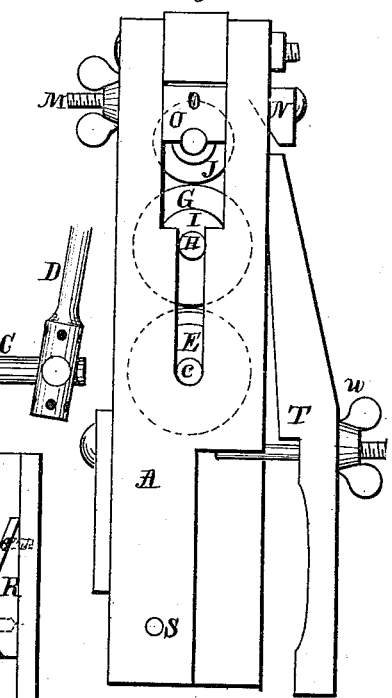
Figure 3:
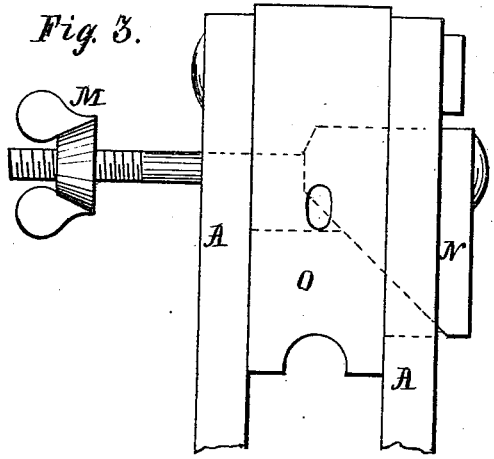
Figure 4:
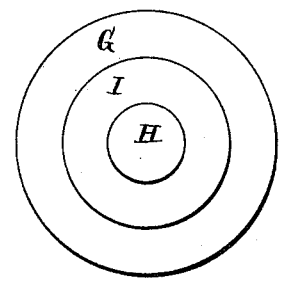

Figure 1 is a view of the side facing the operator. Fig. 2 is a view of the end of the machine; and Fig. 3 is a section of the end, showing the adjusting-wedge in the slot of the movable adjusting-box; and Fig. 4 is a view of the end of the rubber roller, washer, and shaft.

A represents the main frame, which is bolted together in the ordinary manner. B the cut-off slot. The shafts do not touch the frame between the slot and rollers, and thereby prevents the clothes from being soiled. E represents the friction-roller, the extreme outer ends of which are beveled, and provided with a double collar at F F. This roller is made of wood for the purpose of securing friction when wet. D represents the wooden crank, which may be adjusted to accommodate the strength or length of the arm of the operator. G represents the large soft-rubber roller, loosely placed on a small iron shaft, H, and it is prevented from slipping endwise merely by the washers I I.

It will be readily seen that the greatly-increased size and elasticity of my roller, (both of which may be increased, if desired,) give it great superiority over those which are useless the moment the roller becomes loose on the shaft, or depend upon the pressure of corrugations to turn them when worked by cogs; also, in respect to the power required to operate it, and to accommodate itself to varying thicknesses, without changing the tension.

J is a pressure-roller of such construction as to accommodate articles of unusual thickness, and draw them toward the center. M is a thumb-screw to adjust the wedge N, by which the tension of the rollers is regulated, as represented in Figs. 2 and 3, which presses the box down upon the pressure-roller, and as all of the rollers are perfectly free all are thus regulated. P is a rubber water-shield, which is fastened to the upper edge of the cross-piece of the frame, which is also provided with two guards, to prevent the clothes from working off the ends of the rollers. This shield rests against the friction-roller, and prevents the water from following around the roller, and keeps it comparatively dry. Q represents a section of the tub. R a cleat, which is attached to the tub, provided with a hole, through which the pin S, which is fastened into the lower end of the main frame, is inserted. The cleat and pin should be on the crank side, and they hold the machine firmly to the tub, without fastening the clamps F so closely to the tub as to endanger splitting the staves.

Having thus fully described my invention, what I claim as new, and desire to secure by Letters Patent, is—

The large soft-rubber roller G, loosely placed on a small smooth round shaft, in combination with the pressure-roller J, and friction-roller E, all set in the frame A, and operated by the crank D, and wedge N, substantially as and for the purposes herein set forth.

In testimony that I claim the foregoing I have hereunto set my hand this 2d day of July, 1875.

MILO A. RICHARDSON.

Witnesses:
J. WILBUR PARROTT,
CHAS. H. HINMAN.